United States Patent [19] [11] Patent Number: 5,177,677
Nakata et al. [45] Date of Patent: Jan. 5, 1993

[54] POWER CONVERSION SYSTEM

[75] Inventors: Kiyoshi Nakata, Ibaraki; Akira Kimura, Katsuta; Youji Takahashi, Hitachi; Yoshio Tsutsui; Kiyoshi Nakamura, both of Katsuta; Atsushi Abe, Hitachi, all of Japan

[73] Assignee: Hitachi, Ltd., Tokyo, Japan

[21] Appl. No.: 489,324

[22] Filed: Mar. 6, 1990

[30] Foreign Application Priority Data

Mar. 8, 1989 [JP] Japan .................................. 1-53850
Jan. 8, 1990 [JP] Japan .................................. 2-1259

[51] Int. Cl.$^5$ ........................................... H02M 7/219
[52] U.S. Cl. ........................................ 363/89; 363/37; 320/14; 320/21
[58] Field of Search .................... 363/37, 84, 85, 87, 363/89, 125, 127; 320/14, 21, 44

[56] References Cited

U.S. PATENT DOCUMENTS 4,816,985  3/1989  Tanahashi ....................... 363/37 X

FOREIGN PATENT DOCUMENTS

0237012A2  9/1987  European Pat. Off.
62-210866  9/1987  Japan.

OTHER PUBLICATIONS

"The Car Electronics Subsystem", pp. 143-151, no date.

Primary Examiner—Emanuel T. Voeltz
Attorney, Agent, or Firm—Antonelli, Terry, Stout & Kraus

[57] ABSTRACT

A power conversion system is disclosed in which a direct current is taken out of an AC power supply of variable frequency and variable voltage through a PWM converter in such a manner that in a region of low source voltage, the converter input current is limited to a predetermined value to maximize the DC power taking the voltage drop of the power supply into consideration with the power factor of "1" of the power supply, and when the current reaches an allowable maximum, it is limited to that value. In a region of high source voltage, on the other hand, the quadrature component of the input voltage applied to the source voltage is controlled preferentially in a manner to control the converter input voltage below a predetermined value, thus making it possible to secure the maximum power available from the converter over the entire range of operation. If a battery is connected to the DC side, a cooperative operation is made possible while the battery is charged properly.

28 Claims, 11 Drawing Sheets

POWER CONVERSION SYSTEM

BACKGROUND OF THE INVENTION

1. Field of the Invention

The present invention relates to a technique for converting an AC power supply of variable frequency and variable voltage into a DC power, and particularly to a power conversion system suitable for converting an AC voltage of the output of an inverter or an AC power generator for a non-contact current collector used with a magnetically-leviated railway, an automobile or wind power generation into a DC voltage.

2. Description of the Prior Art

A power supply system for producing a DC voltage by use of a power converter from an AC power supply of variable frequency and variable voltage finds a variety of applications including the battery charger for automobiles. An application of such a system as an onboard power supply system for a magnetically-leviated railway is also expected.

Non-contact current collectors for the magnetically-leviated railway are well known and have been disclosed in various media including "The Institute of Electrical Engineers of Japan Journal Division B", Vol. 101, No. 1 (1981), p.p. 33 to 40, "The Journal of 20th National Symposium for Cybernetic Utilization in Railways" 1983, p.p. 549 to 543, and JP-A-61-121773.

The system disclosed in IEEJ Journal, Division B, Vol. 101, No. 1 (1981), p.p. 33 to 40, is for rectifying an AC voltage generated in a current-collecting coil through a diode full-wave rectifier circuit to supply power to a load, and has no function of controlling the DC output voltage.

The system illustrated in the Journal of the 20th National Symposium for Cybernetic Utilization in Railways, 1983, p.p. 549 to 553, on the other hand, further comprises a chopper circuit (booster) in addition to all the component parts included in the aforementioned system to provide the function of controlling the DC output voltage.

Also, the system disclosed in JP-A-61-121773 comprises a power converter having a self-quenchable switching device for dampening the output drop due to the reactance on the AC power side in order to supply a greater amount of power.

In producing a DC voltage from an AC Power generator as in the automobile, a system having a diode rectifier circuit has so far been commonly used with an AC power generator having the function of controlling the field current for regulating the DC output voltage, as illustrated in "The Car Electronics Subsystem", FIG. 3, p. 146, published by Chunichi Co.

In a three-phase AC power supply having an internal impedance (inductance L and resistance R) and balanced in variable frequency and variable voltage, assume that the voltage of respective phase (hereinafter called "the source voltage") is $E_{uo}=E_{vo}=E_{wo}=E_o$, the phase current (hereinafter called "the power current") is $I_u=I_v=I_w=I$, and the power factor angle is $\phi$. If the high harmonics of the voltage and current and the loss of the converter are ignored, the power P available from the power supply is expressed by the equation below.

$$P = 3(E_o I\cos\phi - RI^2) \qquad (1)$$

As seen from this equation, the power P becomes maximum when the equations below are satisfied.

$$\cos\phi = 1 \qquad (2)$$

$$I = E_o/2R = I_1 \qquad (3)$$

Even if the source current more than this is supplied, the power does not increase but rather decreases. In the process, the maximum power $P_{max}$ available from the power supply is given by $$P_{max} = 3E_o^2/4R \qquad (4)$$

The source current, on the other hand, has an allowable maximum value determined by the source capacity or the like. Let the allowable maximum value be $I_{max}$, and the relation indicated below holds from the equation (3).

$$I = E_o/2R \leq I_{max}$$

$$E_o \leq 2RI_{max} \qquad (5)$$

In this range, the source current is required to be limited below $I_{max}$. Under this condition, the maximum power $P_{max}$ available from the power supply is given as $$P_{max} = 3(E_o I_{max} - RI_{max}^2) \qquad (6)$$

Thus, in accordance with the source voltage, it is possible to produce the power defined by equations (4) and (6) from the power supply.

In a rectifier circuit using a switching device not quenchable by itself such as a diode or a thyristor, the reactance included in the AC power supply side causes an overlapping of commutations at the time of commutation of the device. This phenomenon reduces the power factor of the power supply equivalently. With the increase in the load current, this overlapping of commutations is further enhanced, so that the DC voltage is reduced, thereby making it impossible to supply effective power.

In the case where the commutation overlap angle is less than 60 degree in a three-phase diode full-wave rectifier circuit, for example, the DC output voltage $E_d$ is given by the equation below if the DC current is assumed to be completely smoothed.

$$E_d = E_{do} - (3/\pi)\omega LI_d \qquad (7)$$

where $E_{do}$ is a no-load DC voltage, $\delta$ a power supply angular frequency, L an AC power supply inductance, and $I_d$ a DC current.

In equation (7), the second term on the right side represents a voltage drop due to the commutation overlapping. This voltage drop increases in proportion to the DC current and the power frequency. From the relation of equation (7), the conversion power $P_d$ is determined as $$P_d = E_d I_d = E_{do} I_d - (3/\pi)\omega LI_d^2 \qquad (8)$$

It will be seen that the phenomenon of the commutation overlapping reduces the conversion power $P_d$ by an amount equivalent to the second term on the right side in the above equation. Especially in the region of high source frequency where the reactance is large, power cannot be taken out effectively from the power supply.

Also, in the region of low source voltage where the DC output voltage is also low, power cannot be supplied until the DC output voltage reaches the battery voltage, and therefore the battery fails to be charged. In the meantime, the load is supplied with power only from the battery, thus increasing the burden on the battery. If a predetermined level of the DC output voltage is to be maintained, a separate boosting device or the like is necessary.

In contrast, JP-A-61-121773 discloses a system intended to dampen the drop of the output by reducing the commutation overlapping as far as possible. Even this system is unable to remove the commutation overlapping completely, and a predetermined value of the DC output voltage of this system is capable of being maintained only in a limited source voltage range, as in the case of the aforementioned diode rectifier circuit.

If a voltage-type PWM converter with a self-quenching device including a power transistor is used as a power converter, the Positive utilization of the reactance on the AC Power supply side prevents the commutation overlapping. The conventional methods of control, however, fail to take into consideration the operation under a low source voltage with the result that an attempt to collect from a power supply a current far exceeding the current value indicated by equation (3) has caused an undesirable power reduction within an allowable maximum value of the source current. In the region of high source voltage, on the other hand, a maximum value of the AC input voltage of a PWM converter primarily determined by the DC voltage, limits the range of the source voltage where the PWM converter is operable. The system disclosed in JP-A-62-210866 is known as one for solving these problems. In this known system, when the source voltage increases to a level where the input voltage approaches a maximum value, an internal control variable associated with the input voltage is corrected in accordance with the difference between the maximum value and the input voltage to prevent the input voltage from exceeding the maximum value, thereby making possible a continued operation. This system, in which the input voltage is limited below the maximum value by a complicated control loop, poses the problem of how a stable control characteristic is to be secured.

SUMMARY OF THE INVENTION

An object of the present invention is to provide a power conversion system adapted to supply a maximum power thereof over the entire operation range of an AC power supply of variable frequency and variable voltage.

Another object of the present invention is to provide a power conversion system capable of proper control of charge and discharge of a battery in accordance with the conditions of an AC power supply and also supplying the necessary power to a load.

According to one aspect of the present invention, there is provided a power conversion system comprising means in which the input current of a power converter for converting the AC power of variable frequency and variable voltage into a DC power is limited in accordance with the frequency or voltage of the AC power supply or an equivalent signal.

According to another aspect of the present invention, there is provided a power conversion system comprising means for limiting to a predetermined value the component in phase with the source voltage, of the input voltage of a power converter for converting an AC power of variable frequency and variable voltage into a DC power.

DESCRIPTION OF THE PREFERRED EMBODIMENTS

An embodiment of the present invention will be explained below with reference to the accompanying drawings.

Figure 1:
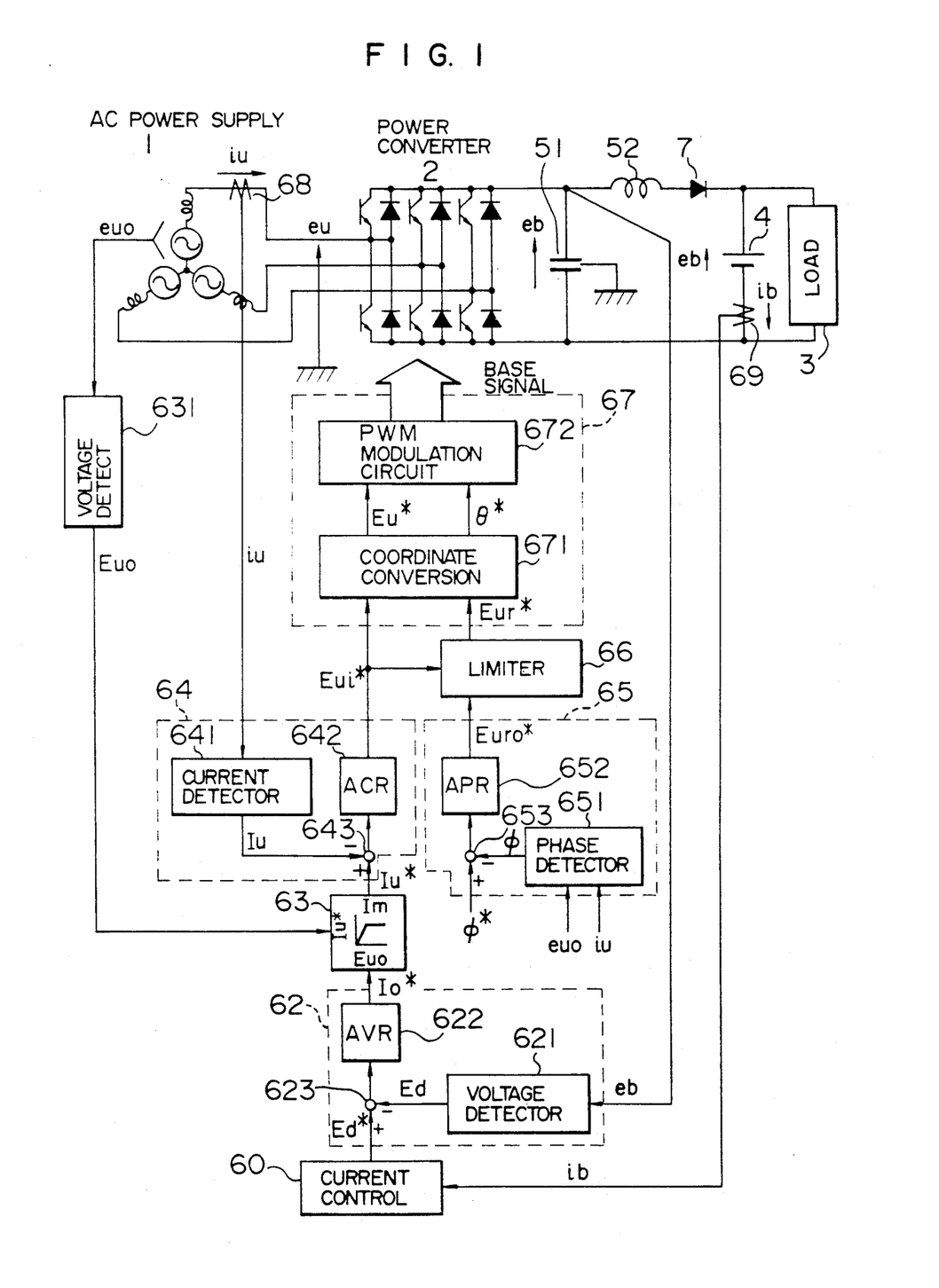
FIG. 1 is a diagram showing a general configuration of a power conversion system according to an embodiment of the present invention.

In FIG. 1, a power conversion system is interposed between a three-phase AC power supply 1 and a load 3. The AC power supply includes therein an internal impedance made up of an inductance and a resistance for generating a three-phase AC voltage of variable frequency and variable voltage. An output of an onboard power system of a magnetically-leviated railway (non-contact current-collecting system), an AC power generation system for the automobile or an inverter is an example of such a three-phase AC power of variable frequency and variable voltage.

The output side of the power supply 1 is connected with a power converter (voltage-type PWM converter) 2 including a plurality of switching devices of transistors which may be any self-quenching switching devices such as gate turn-off thyristors and diodes. Each transistor is subjected to a switching operation in response to a pulse signal for converting AC power into DC power. The output side of this power converter 2 is connected with a filter circuit including a filter capacitor 51, and a filter reactor 52 together with a reverse current-blocking diode 7, the cathode side of which is connected with a battery 4 in parallel to the load 3. More specifically, the output voltage of the power converter 2 is smoothed by the filter circuit, and the DC voltage thus smoothed is supplied to the battery 4 and the load 3. Apart from the configuration of the main circuit explained above, a control circuit will be described below.

The control circuit includes battery control circuit 60, a voltage control circuit 62, a current-limiting circuit 63, a current control circuit 64, a phase control circuit 65, an in-phase component-limiting circuit 66, a pulse width control circuit 67 and current transformers 68, 69.

Figure 2:
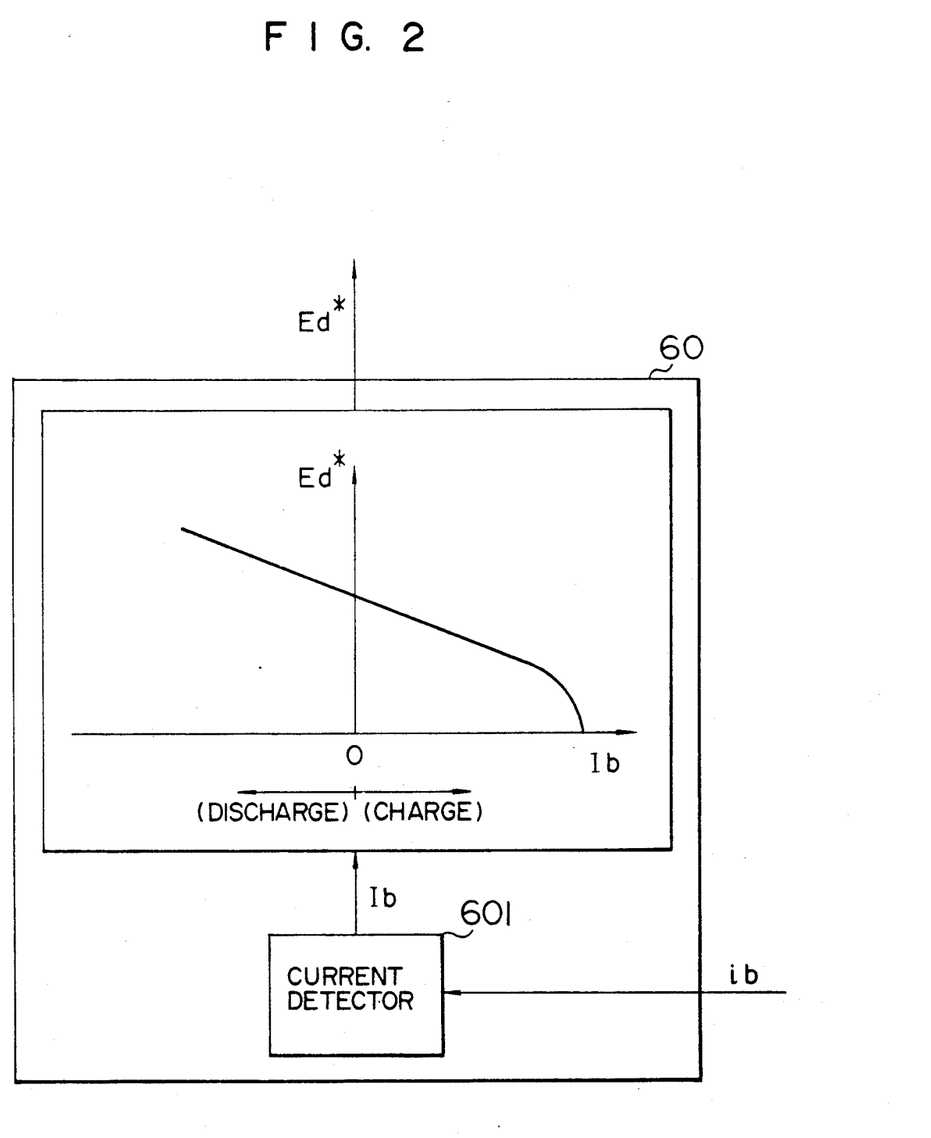
FIG. 2 is a diagram showing a configuration of a battery control circuit.

The battery control circuit 60 prepares such a DC voltage command $E_d^*$ as to enable the battery current $I_b$ to reach a predetermined value in order to hold the battery current always below a rated charging current. A circuit having such a function is shown in FIG. 2.

In the case where the battery current $i_b$ is larger in positive direction when the battery is being charged, an arrangement is made to reduce the DC voltage command $E_d^*$. A large battery current $i_b$ in positive direction is caused by a large supply of power from the AC power supply 1. If the DC voltage $e_d$ is left as it is in such a case, the battery current $i_b$ would become so excessive as to shorten the service life of the battery 4. If the battery current $i_b$ is large in the negative direction, on the other hand, it indicates a shortage of power supplied from the AC power supply 1, in which case the maximum power available from the AC power supply 1 is required to be supplied by increasing the DC voltage command $E_d^*$.

Figure 3:
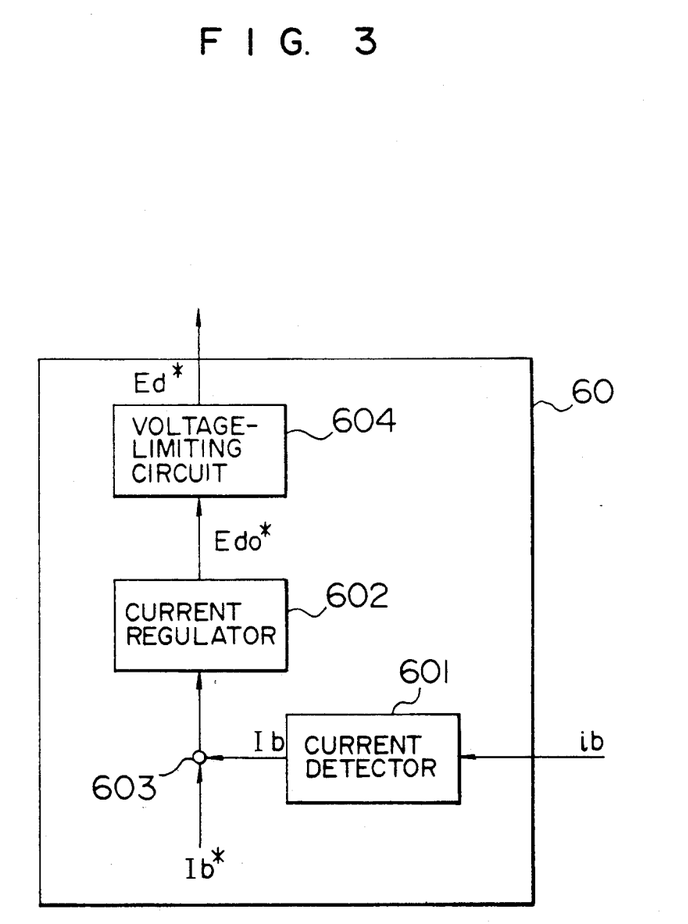
FIG. 3 shows another configuration of the battery control circuit.

Another embodiment of the battery control circuit 60 is shown in FIG. 3.

The battery control circuit 60 includes a current detector 601 for converting an output signal of the current transformer 69 into an average value of the battery current $i_b$, an adder 603 for generating a signal corresponding to the difference between the battery current $i_b$ and the battery current command $i_b^*$ representing the maximum value of a battery charging current as a target condition amount of the battery 4, and a current regulator 602 for producing a DC voltage command $E_{do}^*$ for controlling the output of the adder 603 to zero. This $E_{do}^*$ is applied to the voltage limiting circuit 604.

Figure 4:
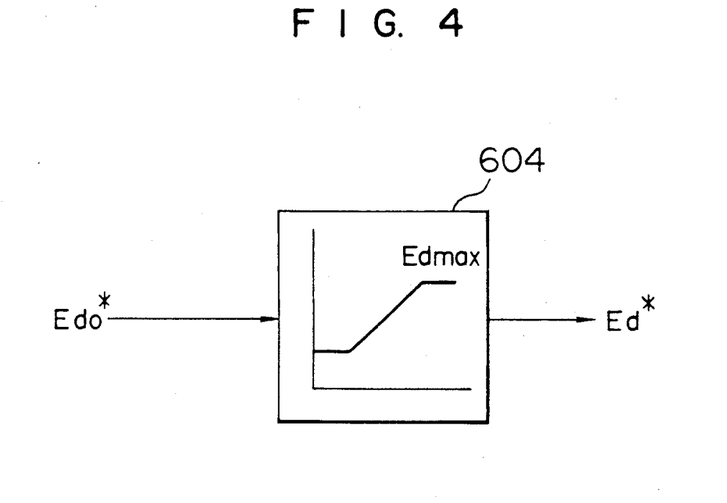
FIG. 4 shows a configuration of a voltage-limiting circuit.

The voltage-limiting circuit 604, as shown in FIG. 4, is configured to produce the DC voltage command $E_d^*$ which is the DC voltage command $E_{do}^*$ limited to a predetermined value. In other words, the voltage-limiting circuit 61 is provided as an element for limiting the command $E_{do}^*$ within a predetermined range.

The battery control circuit 60 including the aforementioned component units permits proper charging of the battery 4 within a proper range of the rated charging current, thus preventing the battery from being deteriorated by an excessive charging current. Also, the battery is capable of supplying a shortage, if any, of the power in such cases as a low source voltage.

In the case where power is supplied to the load 3 simply without any battery 4, the battery control circuit 60 may be done without.

Figure 17:
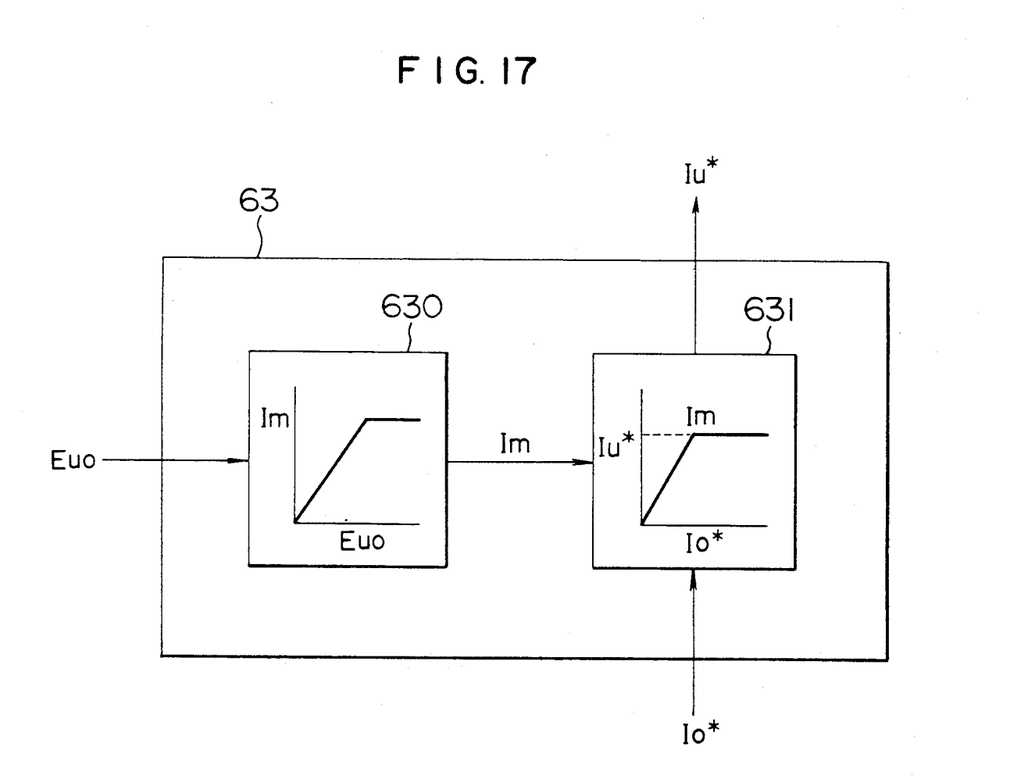
FIG. 17 is a diagram showing the circuit arrangement of the current-limiting circuit.

The voltage control circuit 62 includes a voltage detector 621 for producing a voltage across the filter capacitor 51 as an output volta $E_d$ of the power converter 2, an adder 623 for producing a signal corresponding to the difference between the DC voltage command $E_d^*$ and the DC voltage $E_d$, and a voltage regulator 622 for producing an input current command $I_o^*$ having an integration element for dampening the output of the adder 623 to zero. The command $I_o^*$ is supplied to the current-limiting circuit 63 which is also supplied with a signal from a voltage detection circuit 631 for converting the output voltage of the AC power supply 1 into a voltage $E_{uo}$ of an effective value. The current-limiting circuit 63 functions, as shown in FIG. 17, to limit the input current command $I_o^*$ corresponding to the input signal at a value not exceeding a limit value $I_m$ and produces a limited current command $I_u^*$.

The current-control circuit 64 includes a current detector 641 for converting the output current of the current transformer 68 into an input current $I_u$ of an effective value, an adder 643 for producing a signal corresponding to the difference between the input current $I_u$ and the current command $I_u^*$, and a current regulator 642 having an integration element for producing a rectangular component command $E_{ui}^*$ as an output voltage command for dampening the output signal of the adder 643 to zero.

The phase control circuit 65 includes a phase detector 651 for producing a power factor angle $\phi$ from the source current $i_u$ and the source voltage $e_{uo}$, an adder 653 for producing a signal corresponding to the difference between the power factor angle command $\phi^*$ (normally zero) and the power factor angle $\phi$, and a phase regulator 652 having an integration element for producing an in-phase component command $E_{uro}^*$ to secure a component of the input voltage of the power converter 2 in phase with the source voltage.

Figure 5:
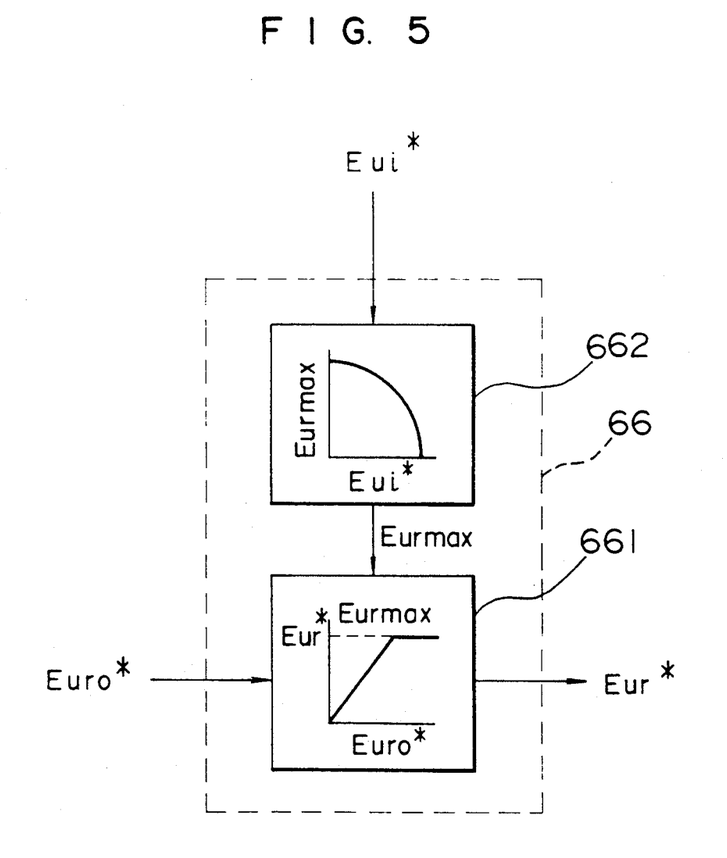
FIG. 5 shows a configuration of an in-phase component-limiting circuit.

The in-phase component-limiting circuit 66, as shown in FIG. 5, includes a limited value generation circuit 662 for producing a limited valu $E_{urmax}$ corresponding to the input voltage quadrature component command $E_{ui}^*$, and a limiting circuit 661 for limiting the in-phase component command $E_{uro}^*$ in accordance with the output of the limited value generation circuit 662. Specifically, the in-phase component-limiting circuit 66 is provided for limiting the magnitude of the input voltage of the power converter 2 below the predetermined value $E_{urmax}$ in accordance with the input voltage quadrature component command $E_{ui}^*$. These limited values are set in such a manner that the in-phase component command $E_{ur}^*$ of the input voltage of the power converter 2 satisfies the equation (9) below.

$$E_{ur}^{*2} \leq E_{urmax}^2 - E_{ui}^{*2} \tag{9}$$

After the relation $E_{uro}^* = E_{urmax}$ is reached as a result of the operation so as to satisfy the equation (9), the power conversion is effected with priority given to the quadrature component command $E_{ui}^*$ of the input voltage associated with the conversion power. In this case, the operation with maximum power factor is possible, thereby constituting a control system under a highly stable condition.

The pulse width control circuit 67 includes a coordinate converter 671 as coordinate conversion means for subjecting the quadrature component command $E_{ui}^*$ and the in-phase component command $E_{ur}^*$ to the rectangular-to-mono-pole coordinate conversion to generate an amplitude command $E_u^*$ and a phase command $\theta^*$, and a pulse width modulation circuit 672 for generating a pulse width modulation signal in accordance with the amplitude command $E_u^*$ and the phase command $\theta^*$ and supplying the pulse width signal as a base signal to each transistor of the power converter 2. In other words, the pulse width control circuit 67 makes up pulse signal generation means together with the in-phase component-limiting circuit 66 and the phase control circuit 65.

Figure 6:
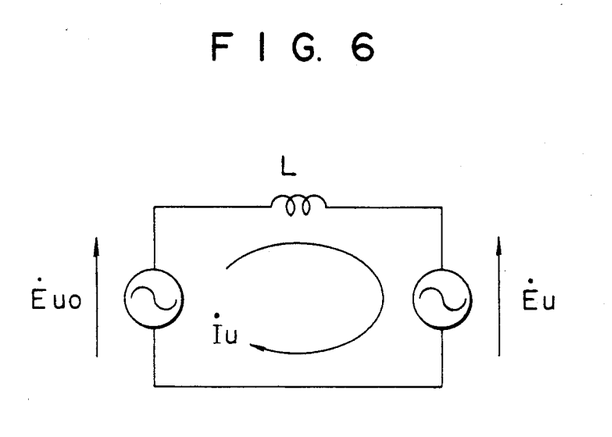
FIG. 6 is a diagram showing a circuit equivalent to the AC power supply side of a main circuit.

Assuming that the input voltage of the power converter 2 provides an AC voltage source, the AC circuit for a given phase of the power converter 2 is expressed by an equivalent circuit shown in FIG. 6. In this case, the high harmonic components of the voltage and current and the resistance of the power supply 1 are ignored.

Figure 7:
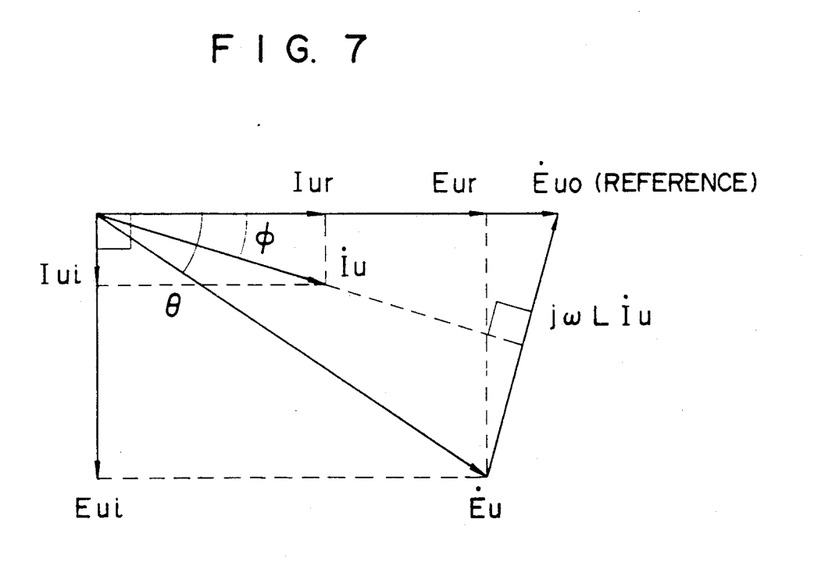
FIG. 7 is a vectorial diagram for explaining the operation of the circuit shown in FIG. 6.

In FIG. 6, the input current $\dot{I}_u$ is expressed by equation (10) below.

$$\dot{I}_u = \frac{\dot{E}_{uo} - \dot{E}_u}{j\omega L} \tag{10}$$

where $I_u$ is determined in accordance with the vectorial diagram of FIG. 7, and the effective component $I_{ur}$ and the reactive component $\dot{I}_{ui}$ of the input current $I_u$ by equations (11) and (12) below.

$$I_{ur} = -\frac{E_{ui}}{\omega L} \tag{11}$$

$$I_{ui} = -\frac{E_{ur} - E_{uo}}{\omega L} \tag{12}$$

where $E_{ur}$ is an in-phase component (based on $E_{uo}$) and $E_{ui}$ an input voltage quadrature component (based on $E_{uo}$).

From equation (11), the effective component $I_{ur}$ is determined by the input voltage quadrature component $E_{ui}$. From equation (12), on the other hand, the reactive component $I_{ui}$ is dependent on the input voltage in-phase component $E_{ur}$. As a result, in controlling the power converter 2 by a vector control system, the conversion power may be controlled by the input voltage quadrature component $E_{ui}$ and the power supply power factor by the input voltage in-phase component $E_{ur}$ independently of each other. If an in-phase component $E_{ur}$ that satisfies the relation $E_{ur} - E_{uo} = 0$ is selected in the process, the reactive component $I_{ui}$ becomes zero, and the power factor of the power supply may be controlled to "1".

Figure 8:
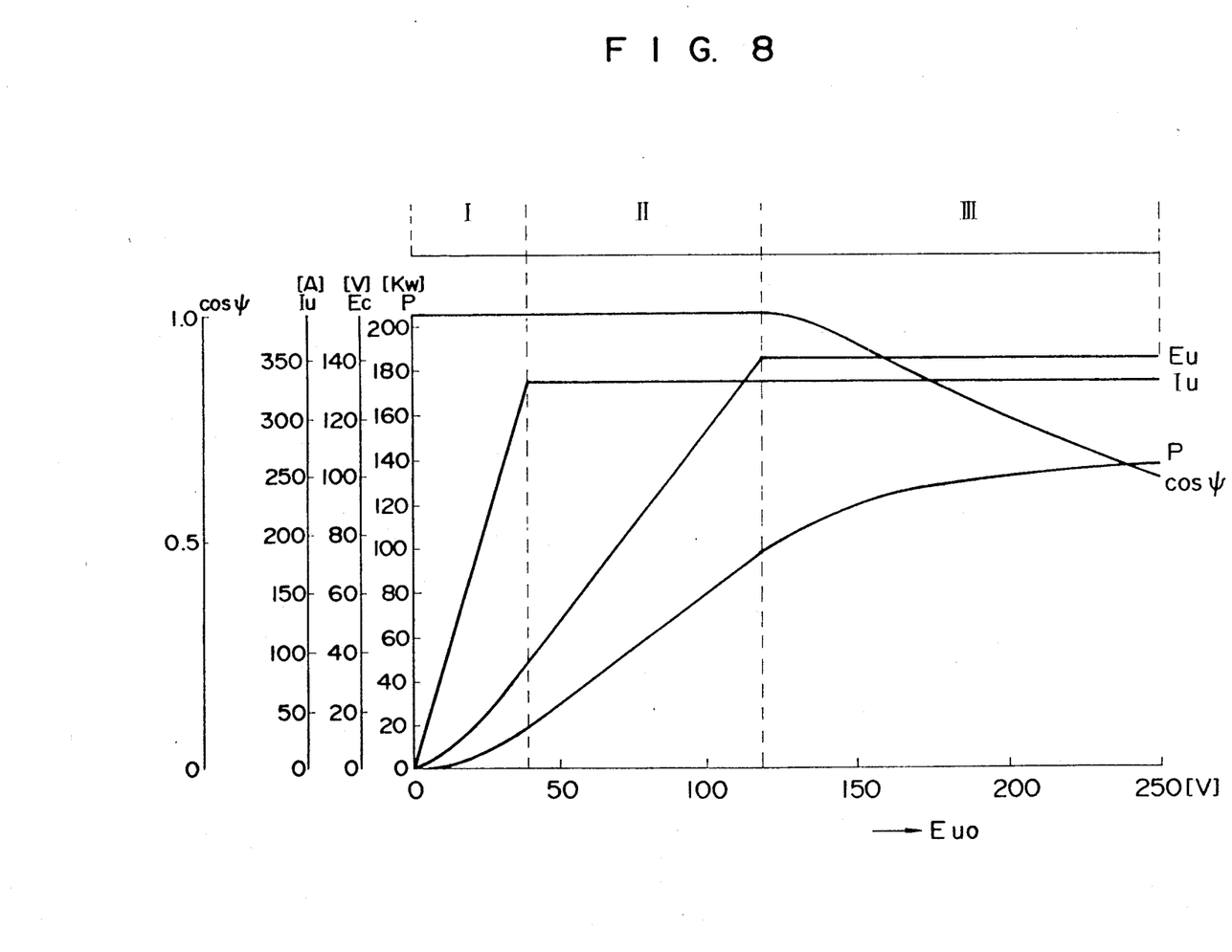
FIG. 8 is a diagram showing an operation characteristic of the system of FIG. 1.

Now, the operation of a power converter providing an application of the aforementioned vector control system will be explained by voltage region with reference to the accompanying drawings including FIG. 8.

I. Region I where the output voltage of the AC power supply 1 is low

Figure 9:
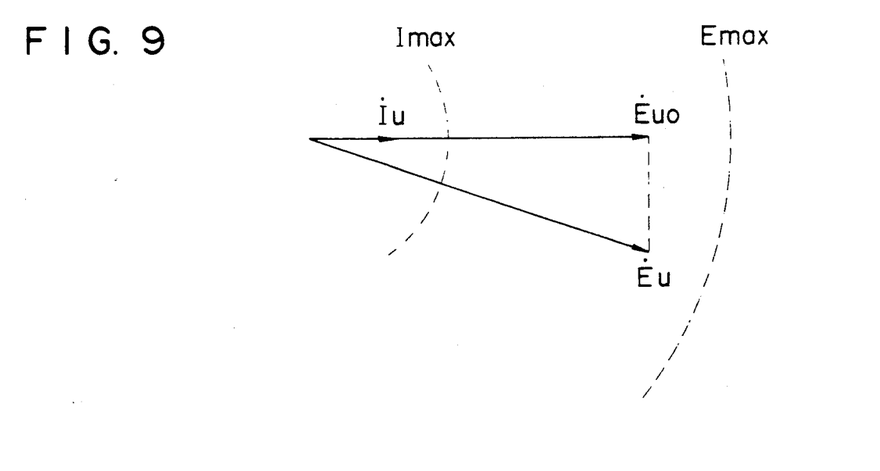
FIGS. 9, 10 and 11 are vectorial diagrams for explaining the operation in FIG. 8.

In this region where the source voltage and the source frequency are low, the power factor "1" and the supplied power are both capable of being maximized without any limitations. FIG. 9 shows that neither the current $I_u$ or the volta $E_u$ reaches the maximum value and the maximum power can be supplied within the range of a set value. In this case, the current-limiting circuit 63 sets a limit value $I_m$ to hold the relation of equation (3) in accordance with the source volta $E_{uo}$ detected by the voltage detection circuit 631. Also, the current command $I_o^*$ is limited in a manner not to exceed the limit value $I_m$ and the current command $I_u^*$ is supplied to the current control circuit 64. In the process, the phase control circuit 65 reduces the power factor angle command $\phi^*$ at zero to control the power factor of the power supply to "1". Specifically, until the input current reaches the allowable maximum value of the AC power supply 1, the power conversion control is effected to produce a maximum power within a set current range.

II. Region II where the source voltage is lower than a set voltage

Figure 10:
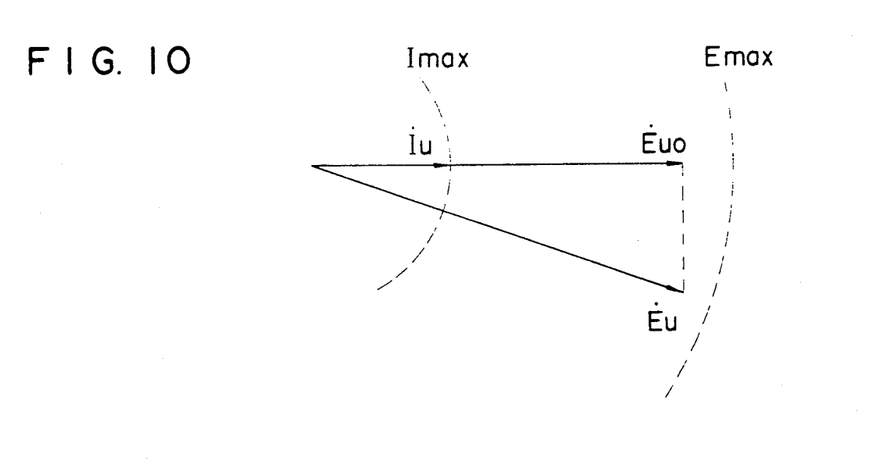

In this region, the current reaches a maximum current value primarily determined by the power supply capacity. FIG. 10 shows that the current $I_u$ reaches an allowable maximum current $I_{max}$ while the voltage $E_{uo}$ fails to reach an allowable maximum. As a result, the operation is possible with the power factor "1" and the power having an allowable maximum current $I_{max}$. If the power required of the load is small, it is not of course necessary to operate at the allowable maximum current $I_{max}$.

In this case, the current-limiting circuit 63 sets the limit value $I_m$ at an allowable maximum of the source current, within which the phase control circuit 65 effects the conversion control to produce a maximum power with the power supply power factor of "1". Under this condition, if there is more conversion power than required by the load 3, the battery 4 is charged by such conversion power. If the conversion power is short of the power required by the load 3, in contrast, power from the battery 4 is supplied to the load 3.

Figure 11:
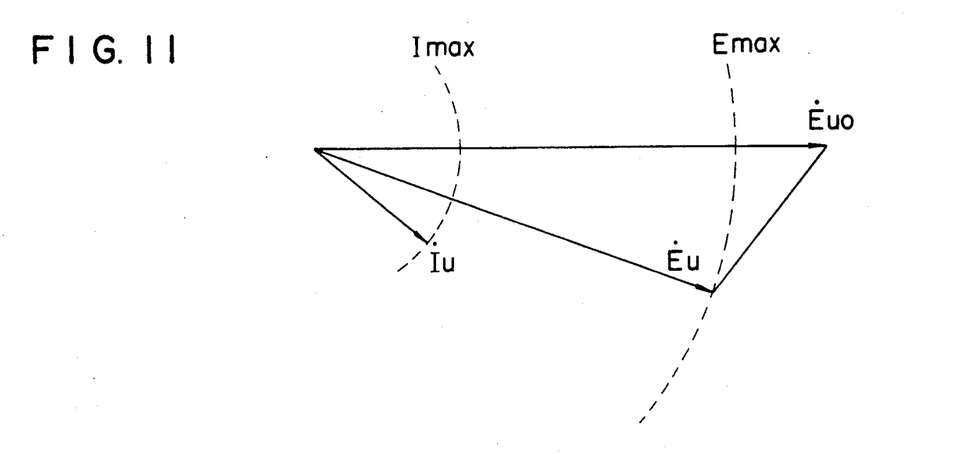

III. Region III where the source frequency and voltage are so high that the input voltage of the converter 2 exceeds a set value In this region, the current $\dot{I}_u$ has reached a maximum value and the source voltage $\dot{E}_{uo}$ has also exceeded a maximum value of the AC input voltage of the power converter 2 which is determined primarily by the DC voltage. In FIG. 11, the function of controlling the power factor at "1" is killed because an activation of such a function would damage the devices. As a result, the current $\dot{I}_u$ is activated to follow the allowable maximum current $I_{max}$ and the input volta $E_u$ along the maximum volta $E_{max}$.

The phase control circuit 65 supplies the in-phase component-limiting circuit 66 with such an in-phase component command $E_{uro}^*$ for the input voltage as to render the power factor of "1" of the AC power supply 1. A maximum value of the in-phase component corresponding to the quadrature component $E_{ui}^*$ is determined in this in-phase component-limiting circuit 66.

The in-phase component command $E_{uro}^*$ of the input voltage is limited to a predetermined value to hold the magnitude of the input voltage below a predetermined value, and power is supplied to the load 3 within the range of the allowable maximum value of the source current.

In this way, if the voltage command $E_{uro}^*$ is limited to a predetermined value, the power factor and the power are controlled by the quadratual component $E_{ui}$, so that it is possible to increase the power to a maximum limit even if the power factor of the power supply falls by increasing the quadrature component $E_{ui}$ with $E_u$ kept at the same magnitude.

More specifically, in the region I of low source voltage, the input current of the converter is limited in a manner to maximize the power produced from the converter and is also limited to an allowable maximum value of the power supply or the like which may be reached. In the region III of high source voltage, in contrast, the component of the input voltage in phase with the source voltage is limited. By limiting this in-phase component, the component of the converter input perpendicular to the source voltage associated with the conversion power is controlled preferentially. As a consequence, the maximum power available from the power converter is supplied over the entire range of operation.

According to the embodiment described above, the filter capacitor 51 or the filter reactor 52 is inserted as a filter circuit, and therefore the stress exerted on the battery 4 by the high harmonics flowing in from the power converter 2 is alleviated. The filter capacitor 51 is mainly for reducing the high harmonic current contained in the output of the power converter 2 and may be used also for maintaining the DC voltage in the case where the battery 4 is eliminated and the load 3 has no electro-motive force.

Also, the diode 7 is capable of controlling the reverse flow of the current into the power converter 2 from the battery 4, and thus is capable of preventing the battery 4 from discharging. Since the DC voltage command $E_{do}^*$ limited within a predetermined range by the voltage-limiting circuit 61, on the other hand, the proper charging is possible within a voltage range dependent on the characteristics of the battery 4, thus preventing the excessive charging or discharging.

Further, if the maximum operating power of the power converter 2 is determined in advance, the magnitude of the input voltage may be limited to a predetermined value by fixing the in-phase component command $E_{uro}^*$ of the input voltage to a predetermined value in accordance with the magnitude of the source voltage $E_{uo}$. Specifically, when the source volta $E_{uo}$ exceeds a predetermined value, the in-phase component command $E_{uro}^*$ of the input voltage is fixed to a predetermined value $E_{urmax}$. If the value $E_{urmax}$ is set in a manner to satisfy the relationship of the equation $$E_{umax}^2 \leq E_{ui}^{*2} + E_{urmax}^2 \qquad (13)$$

against the quadrature component command $E_{ui}^*$ for any input voltage, then the magnitude of the input voltage is limited below a predetermined value. This greatly simplifies the in-phase component-limiting circuit 66.

Figure 12:
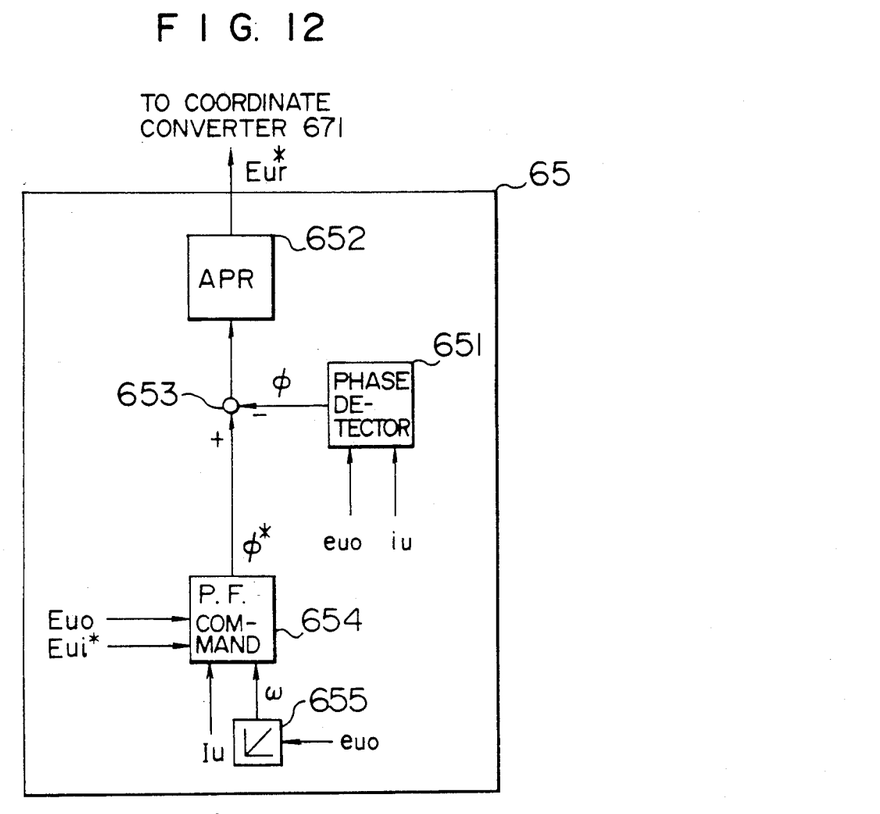
FIG. 12 is a diagram showing a configuration of another embodiment of a phase control circuit 65.
Figure 13:
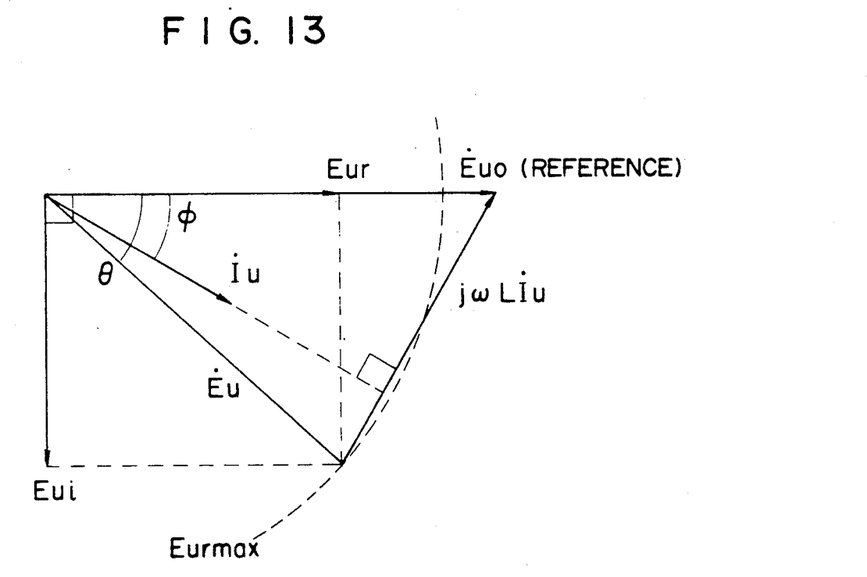
FIG. 13 is a vectorial diagram for explaining the operation in FIG. 12.

It is also possible, as shown in FIG. 12, to limit the in-phase component of the input voltage by regulating the power factor angle command $\phi^*$ in accordance with the source voltage. Specifically, as seen from FIG. 13, since the in-phase component $E_{ur}$ of the input voltage for a given power factor angle $\phi$ is given as $$E_{ur} = E_{uo} + \omega \cdot L I_u \sin\phi \qquad (14)$$

the in-phase component of the input voltage may be limited by determining the power factor angle command $\phi^*$ in such a manner that the in-phase component $E_{ur}$ of the input voltage satisfies the relationship of equation (9) in accordance with the source volta $E_{uo}$. The resulting advantage is that the compensation system including the power factor regulator 652 is operable continuously.

Unlike in the aforementioned embodiment in which three phase are controlled collectively by U-phase voltage and current, an input voltage control circuit may be provided for each phase.

The detection signal of the detector 631 may be the power frequency, if there exists a specific relationship therebetween. In such a case, a voltage-detecting sensor such as a pickup coil is required if an accurate source voltage is to be secured without being affected by the impedance changing with the power frequency. In the case where the source voltage is proportional to the power frequency, however, the pickup coil or the like may be done without to the extent that the power frequency is detected and converted into a source voltage.

Figure 14:
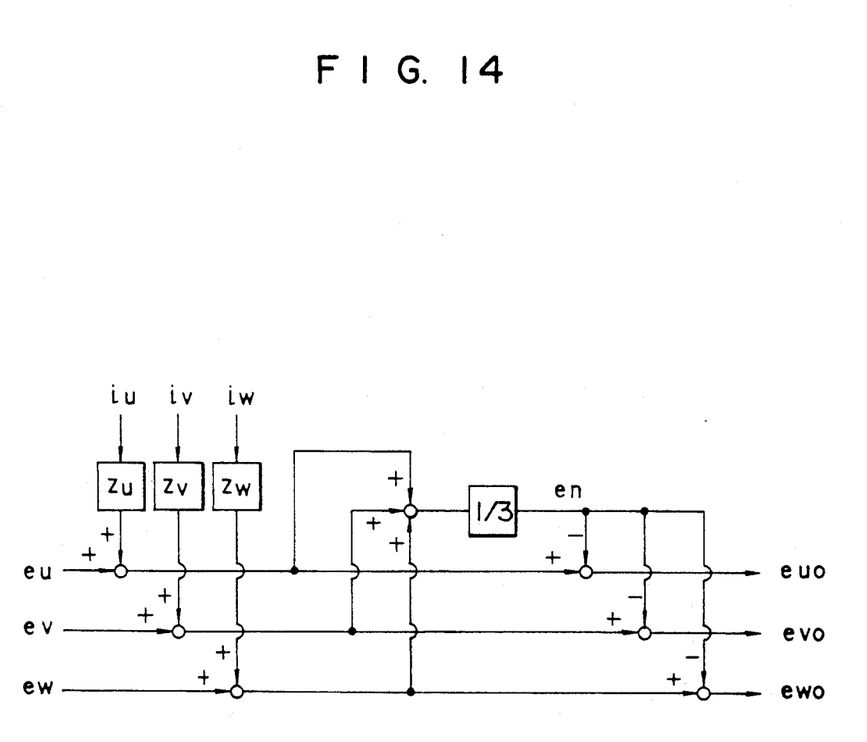
FIG. 14 is a diagram showing a configuration of means for estimating a source voltage.

Further, means for estimating a detection signal of the detector 631 from the source current and the input voltage of the power converter may be used. FIG. 14 shows an embodiment limited to a detector. According to this embodiment, the source voltage is estimated by this estimating means in the manner mentioned below.

The equation of relationship shown below holds between the voltages and currents of various parts.

$$\begin{aligned} e_{uo} + e_n &= e_u + z_u i_u \\ e_{vo} + e_n &= e_v + z_v i_v \\ e_{wo} + e_n &= e_w + z_w i_w \end{aligned} \qquad (15)$$

where $e_{vo}$ is the source voltage, $e_n$ the voltage at a power neutral point, $e_v$ the input voltage of the power converter, $z_v$ the power impedance, $i_v$ the source current, and $v = u, v, w$. From this equation, the voltage $e_n$ at a power neutral point with a balanced source voltage is expressed as $$e_n = (e_u + e_v + e_w + z_u i_u + z_v i_v + z_w i_w)/3 \qquad (16)$$

Thus, if the power impedance is known, the source voltage can be estimated by use of the relationships of equations (15) and (16). The source voltage is detected with high accuracy in this way without any sensor for detecting the source voltage.

Furthermore, the detection signal of the detector 631 may alternatively be a vehicle speed, if there exists a specific relationship therebetween. As long as the source voltage is primarily determined in relation to the vehicle speed, the sensor or the like for voltage detection may be done without. In such a case, the only function of the detector 631 may be to convert the vehicle speed into a source voltage.

In the embodiment shown in FIG. 1, the input voltage of the converter may be limited by limiting the reactance voltage of the AC power supply. The reactance voltage is the difference between the source voltage and the input voltage of the converter, and therefore the input current is determinable by calculations if the power frequency is know. In such a case, the current detection circuit is eliminated.

Also, in the embodiment shown in FIG. 1, the converter input voltage may be limited alternatively by limiting the converter output current. Specifically, the DC current providing a converter output current is detected, and an input voltage quadrature component command is prepared in accordance with the difference between the DC current and the value of the DC current command limited in accordance with the source voltage. Regardless of the number of phases of the power supply, only a single current detection circuit may be used.

Figure 15:
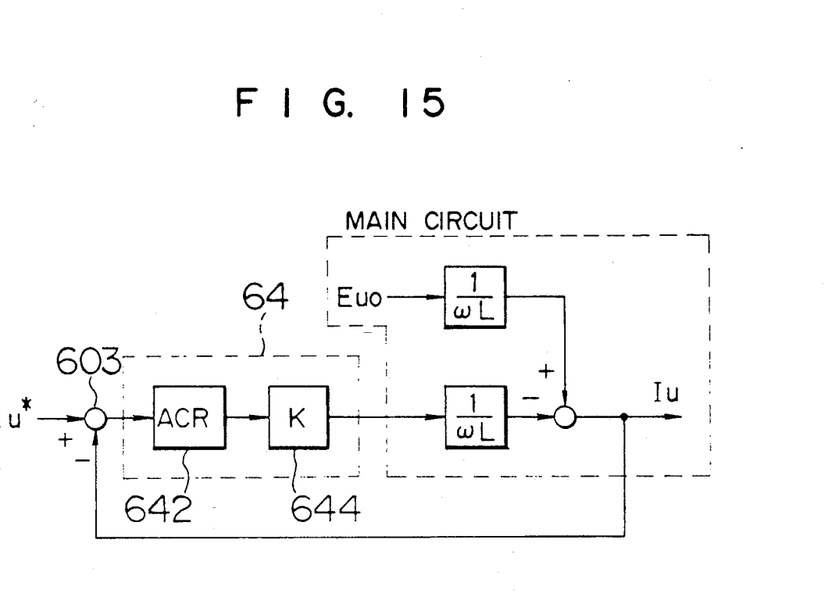
FIG. 15 shows a configuration of another embodiment of a current regulator.
Figure 16:
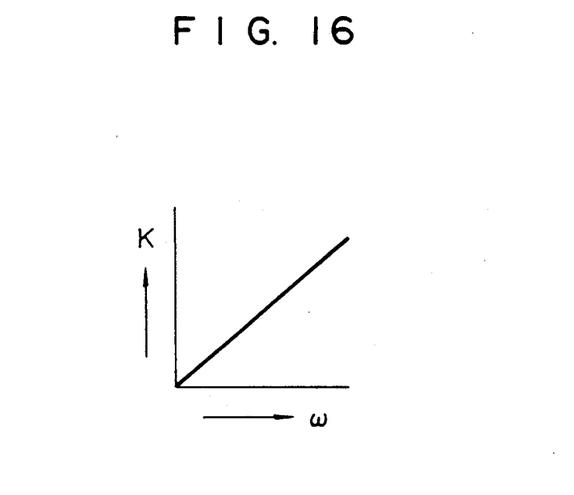
FIG. 16 is a characteristic diagram showing the relationship between the power frequency and the gain of the system shown in FIG. 15.

In addition, in the aforementioned embodiment, if a compensation element 644 for changing the DC current command to a value proportional to the angular frequency of the Ac power supply is inserted on the output side of the current regulator 642 as shown in FIG. 15, it is possible to realize a highly stable current control system which maintains a constant loop gain regardless of the angular frequency $\omega$ as shown in FIG. 16.

If the present invention is applied to an AC power generator with a power supply having a field winding for voltage regulation like a battery charger of an automobile or the like, the need of the field current control circuit may be eliminated. Also, the use of an AC generator with a permanent magnet free of a field winding or a slip ring reduces the size and weight of the AC generator.

According to the present invention, a power conversion system for converting an AC power supply of variable frequency and variable voltage into a DC power is adapted to supply a maximum power available from a power converter over the entire operation range.

What is more, in a power conversion system with a battery connected therewith according to the present invention, the input voltage of a power converter is controlled in accordance with the allowable current of the AC power supply and the charging condition of the battery, and therefore the battery is properly charged while improving the utilization rate of the power converter to maximum at the same time. Further, the sharing of power between the power converter and the battery is optimized.

We claim:

1. A power conversion system comprising a power converter for converting an AC signals of an AC power supply having variable frequency and variable voltage into a DC signal, means for controlling turning-on and off of switching elements of the power converter, a load device connected to a DC output side of the power converter, voltage control means for controlling a DC output voltage of the power converter to a predetermined value, and means for limiting an input current of the power converter in accordance with a signal relating to one of the voltage and frequency of the AC power supply.

2. A power conversion system comprising a power converter for converting an AC signal of an AC power supply having variable frequency and variable voltage into a DC signal, means for controlling turning-on and off of switching elements of the power converter, a load device connected to a DC output side of the power converter, voltage control means for controlling a DC output voltage of the power converter to a predetermined value, means for limiting an input current of the power converter in accordance with a signal relating to one of the voltage and frequency of the AC power supply, and a battery connected to the DC output side of said power converter.

3. A power conversion system according to claim 2, wherein the DC output voltage of the power converter is controlled in accordance with a current flowing through the battery current.

4. A power conversion system according to claim 2, further comprising means inserted between the power converter and the battery for preventing a reverse flow of a current from the battery to the power converter.

5. A power conversion system according to claim 2, further comprising means for limiting the DC output voltage of the power converter within a predetermined range.

6. A power conversion system according to claim 2, further comprising a DC filter circuit inserted between the power converter and the load device.

7. A power conversion system according to claim 1, further comprising a DC filter circuit inserted between the power converter and the load device.

8. A power conversion system comprising a power converter for converting an AC signal of an AC power supply having variable frequency and variable voltage into a DC signal, means for controlling turning-on and off of switching elements of the power converter, a load device connected to a DC output side of the power converter, voltage control means for controlling a DC output voltage of the power converter to a predetermined value, and means for limiting a reactance voltage of the AC power supply in accordance with a signal relating to one of the voltage and frequency of the AC power supply.

9. A power conversion system comprising a power converter for converting an AC signal of an AC power supply having variable frequency and variable voltage into a DC signal, means for controlling turning-on and off of switching elements of the power converter, a load device connected to a DC output side of the power converter, voltage control means for controlling a DC output voltage of the power converter to a predetermined value, means for estimating a value of a signal relating to one of the voltage and frequency of the AC power supply in accordance with an input voltage or an input current of the power converter, and means for limiting an input current of the power converter according to the estimated value.

10. A power conversion system comprising a power converter for converting an AC signal of an AC power supply having variable frequency and variable voltage into a DC signal, means for controlling turning-on and off of switching elements of the power converter, a load device connected to a DC output side of the power converter, voltage control means for controlling a DC output voltage of the power converter to a predetermined value, means for limiting an input current of the power converter in accordance with a signal relating to one of the voltage and frequency of the AC power supply, and means for controlling the input current of said power converter by a compensation coefficient which is adjusted in accordance with a signal relating to the frequency of the AC power supply.

11. A power conversion system comprising a power converter for converting an AC signal of an AC power supply having variable frequency and variable voltage into a DC signal, means for controlling turning-on and off of switching elements of the power converter, a load device connected to a DC output side of the power converter, voltage control means for controlling a DC output voltage of the power converter to a predetermined value, and means for setting a component of an input voltage of the power converter in phase with the voltage of the power supply according to a quadrature component of the input voltage of the power converter with respect to the voltage of the power supply.

12. A power conversion system comprising a power converter for converting an AC signal of an AC power supply having variable frequency and variable voltage into a DC signal, means for controlling turning-on and off of switching elements of the power converter, a load device connected to a DC output side of the power converter, voltage control means for controlling a DC output voltage of the power converter to a predetermined value, means for setting a component of an input voltage of the power converter in phase with the voltage of the power supply according to a quadrature component of the input voltage of the power converter with respect to the voltage of the power supply, and a battery connected at the DC output side of the power converter.

13. A power conversion system according to claim 12, wherein the DC output voltage of the power converter is controlled in accordance with a current flowing through the battery current.

14. A power conversion system according to claim 12, further comprising means inserted between the power converter and the battery for preventing a reverse flow of a current from the battery to the power converter.

15. A power conversion system according to claim 12, further comprising means for limiting the DC output voltage of the power converter within a predetermined range.

16. A power conversion system according to claim 12, further comprising a DC filter circuit inserted between the power converter and the load device.

17. A power conversion system according to claim 11, wherein the means for setting the in-phase component includes means for setting a maximum value of the in-phase component based on the quadrature component of the input voltage of the power supply and means for setting the in-phase component at a value less than the maximum value.

18. A power conversion system comprising a power converter for converting an AC signal of an AC power supply having variable frequency and variable voltage into a DC signal, means for controlling turning-on and off of switching elements of the power converter, a load device connected to a DC output side of the power converter, voltage control means for controlling a DC output voltage of the power converter to a predetermined value, means for regulating a phase of an input current of the power supply, and a battery connected at the DC output side of the power converter.

19. A power conversion system comprising a power converter for converting an AC signal of an AC power supply having variable frequency and variable voltage into a DC signal, means for controlling turning-on and off of switching elements of the power converter, a load device connected to a DC output side of the power converter, voltage control means for controlling a DC output voltage of the power converter to a predetermined value, means for setting a component of an input voltage of the power converter in phase with the voltage of the power supply according to a quadrature component of the input voltage of the power converter with respect to the voltage of the power supply, and means for controlling an input current of said power converter by a compensation coefficient adjusted in accordance with a signal relating to the frequency of the AC power supply.

20. A power conversion system comprising a power converter for converting an AC signal of an AC power supply having variable frequency and variable voltage into a DC signal, means for controlling turning-on and off of switching elements of the power converter, a load device connected to a DC output side of the power converter, voltage control means for controlling a DC output voltage of the power converter to a predetermined value, means for limiting an input current of the power converter in accordance with a signal relating to one of the voltage and frequency of the AC power supply, and means for setting a component of an input voltage of the power converter in phase with the voltage of the power supply according to a quadrature component of the input voltage of the power converter with respect to the voltage of the power supply.

21. A power conversion system comprising a power converter for converting an AC signal of an AC power supply having variable frequency and variable voltage into a DC signal, means for controlling turning-on and off of switching elements of the power converter, a load device connected to a DC output side of the power converter, voltage control means for controlling a DC output voltage of the power converter to a predetermined value, means for limiting an input current of the power converter in accordance with a signal relating to one of the voltage and frequency of the AC power supply, means for setting a component of an input voltage of the power converter in-phase with the voltage of the power supply according to a quadrature component of the input voltage of the power converter with respect to the voltage of the power supply, and a battery connected at the DC output side of the power converter.

22. A power conversion system according to claim 21, wherein the DC output voltage of the power converter is controlled in accordance with a current flowing through the battery current.

23. A power conversion system according to claim 21, further comprising means inserted between the power converter and the battery for preventing a reverse flow of a current from the battery of the power converter.

24. A power conversion system according to claim 21, further comprising means for limiting the DC output voltage of the power converter within a predetermined range.

25. A power conversion system according to claim 21, further comprising a DC filter circuit inserted between the power converter and the load device.

26. A power conversion system according to claim 25, further comprising a DC filter circuit inserted between the power converter and the load device.

27. A power conversion system comprising a power converter for converting an AC signal of an AC power supply having variable frequency and variable voltage into a DC signal, means for controlling turning-on and off of switching elements of the power converter, a load device connected to a DC output side of the power converter, voltage control means for controlling a DC output voltage of the power converter to a predetermined value, a battery connected in parallel to the load device, a DC filter circuit including a capacitor connected in parallel to the DC output side of the power converter and a reactor connected in series to the capacitor and the load device, means for preventing a reverse flow of a current from the battery to the power converter, means for limiting an input current of the power converter in accordance with a signal relating to one of the voltage and frequency of the AC power supply, and means for limiting a component of an input voltage of the power converter in phase with the voltage of the power supply to a predetermined value, means for limiting a DC output voltage of the power converter in accordance with a current flowing through the battery, and means for limiting the DC output voltage of the power converter within a predetermined range.

28. A power conversion system comprising a power converter for converting an AC signal of an AC power supply having variable frequency and variable voltage into a DC signal, means for controlling turning-on and off of switching elements of the power converter, a load device connected to a DC output side of the power converter, voltage control means for controlling a DC output voltage of the power converter to a predetermined value, and means for increasing a reactive power of the power supply and setting an effective power of the power supply to a predetermined value.

* * * * *